(12) United States Patent
Fröhlich et al.

(10) Patent No.: US 11,870,048 B2
(45) Date of Patent: Jan. 9, 2024

(54) THERMAL SYSTEMS FOR BATTERY ELECTRIC VEHICLES

(71) Applicant: Outokumpu Oyj, Helsinki (FI)

(72) Inventors: Thomas Fröhlich, Ratingen (DE); Stefan Lindner, Willich (DE)

(73) Assignee: Outokumpu Oyj, Helsinki (FI)

( * ) Notice: Subject to any disclaimer, the term of this patent is extended or adjusted under 35 U.S.C. 154(b) by 499 days.

(21) Appl. No.: 15/734,440

(22) PCT Filed: Jun. 3, 2019

(86) PCT No.: PCT/EP2019/064365
§ 371 (c)(1),
(2) Date: Dec. 2, 2020

(87) PCT Pub. No.: WO2019/233956
PCT Pub. Date: Dec. 12, 2019

(65) Prior Publication Data
US 2021/0226279 A1 Jul. 22, 2021

(30) Foreign Application Priority Data
Jun. 5, 2018 (EP) ..................................... 18175876

(51) Int. Cl.
*H01M 10/6556* (2014.01)
*H01M 10/613* (2014.01)
(Continued)

(52) U.S. Cl.
CPC ......... *H01M 10/6556* (2015.04); *B60L 50/64* (2019.02); *B60L 58/26* (2019.02);
(Continued)

(58) Field of Classification Search
CPC ........... H01M 10/6556; H01M 10/425; H01M 10/613; H01M 10/615; H01M 10/625;
(Continued)

(56) References Cited

U.S. PATENT DOCUMENTS

2012/0141851 A1* 6/2012 Hou ..................... H01M 50/222
429/96
2013/0004808 A1 1/2013 Tschismar
(Continued)

FOREIGN PATENT DOCUMENTS

DE 44 42 825 A1 6/1995
DE 196 48 353 A1 5/1998
(Continued)

OTHER PUBLICATIONS

Extended European Search Report issued by the European Patent Office in relation to European Application No. 18175876.4 dated Nov. 23, 2018 (9 pages).
(Continued)

*Primary Examiner* — Muhammad S Siddiquee
(74) *Attorney, Agent, or Firm* — Quinn IP Law

(57) ABSTRACT

The invention relates to a supporting housing for a battery compartment of electric drive vehicles by using flat metallic sheets as deep-drawn shells which are fitted into each other whereby at least one double-floor is created into which a passive and partly integrated thermal management system for cooling and heating is integrated. The invention also relates to the integration of further functionality-elements like sensors for status measurement are integrated into the "double-floor" and connected with the battery management system.

15 Claims, 4 Drawing Sheets

(51) Int. Cl.
| | |
|---|---|
| *H01M 10/615* | (2014.01) |
| *H01M 10/625* | (2014.01) |
| *H01M 50/224* | (2021.01) |
| *H01M 50/249* | (2021.01) |
| *B60L 50/64* | (2019.01) |
| *B60L 58/26* | (2019.01) |
| *B60L 58/27* | (2019.01) |
| *H01M 10/6567* | (2014.01) |
| *H01M 10/42* | (2006.01) |
| *H01M 10/48* | (2006.01) |

(52) U.S. Cl.
CPC ........... *B60L 58/27* (2019.02); *H01M 10/425* (2013.01); *H01M 10/613* (2015.04); *H01M 10/615* (2015.04); *H01M 10/625* (2015.04); *H01M 10/6567* (2015.04); *H01M 50/224* (2021.01); *H01M 50/249* (2021.01); *B60L 2240/545* (2013.01); *H01M 10/486* (2013.01); *H01M 2010/4271* (2013.01); *H01M 2220/20* (2013.01)

(58) Field of Classification Search
CPC ........... H01M 10/6567; H01M 50/224; H01M 50/249; H01M 10/486; H01M 2010/4271; H01M 2220/20; H01M 10/657; H01M 10/61; H01M 10/653; H01M 10/651; H01M 10/6571; H01M 50/233; B60L 50/64; B60L 58/26; B60L 58/27; B60L 2240/545
See application file for complete search history.

(56) References Cited

U.S. PATENT DOCUMENTS

2015/0090426 A1* 4/2015 Hirsch ...................... F28F 3/12
 165/64
2016/0233468 A1* 8/2016 Nusier ................... B60L 50/64

FOREIGN PATENT DOCUMENTS

| DE | 20 2013 009788 U1 | 1/2014 |
|---|---|---|
| DE | 10 2016 201337 A1 | 8/2017 |
| EP | 2 650 945 A1 | 10/2013 |
| JP | 2017 045551 A | 3/2017 |

OTHER PUBLICATIONS

International Search Report issued by the European Patent Office acting as the International Searching Authority in relation to International Application No. PCT/EP2019/064365 dated Jul. 3, 2019 (4 pages).

Written Opinion of the International Searching Authority issued by the European Patent Office acting as the International Searching Authority in relation to International Application No. PCT/EP2019/064365 dated Jul. 3, 2019 (7 pages).

International Preliminary Report on Patentability issued by the International Bureau of WIPO in relation to International Application No. PCT/EP2019/064365 dated Dec. 8, 2020 (8 pages).

* cited by examiner

THERMAL SYSTEMS FOR BATTERY ELECTRIC VEHICLES

The present invention relates to a supporting housing for a battery compartment of electric drive vehicles by using flat metallic sheets as deep-drawn shells which are fitted into each other whereby at least one double-floor is created into which a passive and partly integrated thermal system for cooling and heating is integrated. The invention also relates to the integration of further functionality-elements like sensors for status measurement are integrated into the "double-floor" and connected with the battery management system.

Parallel to the development of the automobile with combustion engines at the end of the $19^{th}$ century, researchers also developed successfully on electric vehicles like Werner von Siemens with his electrically powered carriage (1882). Because of their significant expanded range, availability and price of the fossil fuels as well as the quick refuel process, passenger cars with combustion engines dominate the $20^{th}$ century. With the end of the $20^{th}$ century and the changing frame conditions like a price increase and limitedness of fossil fuels, electric vehicles experience a renaissance.

In general, electric drive vehicles are using an electric drive combined with entrained energy storage as a drive concept. Depending on the respective drive concept electric drive vehicles can be divided into Battery Electric Vehicles (BEV) using purely electric power, Hybrid Electric Vehicles (HEV), Plug-in Hybrid Electric Vehicles (PHEVs) or Range Extended Electric Vehicles (REEV) combining an electric engine with combustion motor. Also Fuel Cell Vehicles (FCV) or Fuel Cell Hybrid Vehicles (FCHV) where the chemical stored energy in the form of hydrogen is changed into electric energy are one additional group of electric vehicles. As an energy storage system high-voltage batteries (accumulators) like a lithium ion batteries are used as a base cell and then interconnected to modules. Various modules are assembled to the final vehicle battery. The vehicle battery is protected by a battery compartment, also called battery housing, battery pack, battery case or battery cover.

Beside the increase of the battery range and the way how to protect the batteries in the case of crashes and intrusions, the topic of integration further functionalities like a thermal management system or sensor technology to measure surrounding conditions and battery status becomes more and more importance. The background is that the degree of efficiency for temperature-sensitive lithium-ion drive batteries amount to 95%. The remaining 5% represent lost heat and must be lead away especially under higher surrounding temperatures or during high-voltage loading because at battery temperatures over 35° C. the charging capacity of the batteries decreases and the aging process is speeded-up. Background is that the degradation of the cell chemistry is accelerated and reduces the component lifetime. There is a direct relation between temperature and chemical reaction: The higher the temperature, so much faster is the reaction. From state of the art Battery Electric Vehicles it is known that more than 18,000 battery cells are integrated into a battery compartment which adds up the lost heat. In general, there are two ways to create a cooling system: A direct cooling system which is integrated into the battery compartment and has direct, more efficiency contact with the battery cells or battery modules like known from the U.S. Pat. No. 8,758,924B2 where a cooling tube is interposed between different rows of battery cells having a direct contact to them. Another way of set-up a cooling system would be an indirect one which surrounded the battery compartment and cool therefore indirect the whole compartment without a danger of a short circuit in the case of a leakage. An advantage of the second design way is that an easier access is given, e.g. during a repair case or for a replacement of components. Further, there is no direct contact between the cooling medium like water also during a crash situation, means the systems are separated from each other. In point of the cooling medium, different systems are state of the art distributed: Air cooling or liquid cooling with different kinds of fluids like water, coolant or refrigerant.

But cooling is not a unique requirement regarding to temperature: Also having a temperature lower than 15° C., the charging capacity of the batteries decreases and the battery behavior is sluggish, what means that the chemical reactions are decelerated with longer times for charging and discharging. Therefore, a heating system is also necessary. The complete system of temperature measuring and controlling is called as thermal management. The ideal temperature of the batteries which is aimed by the thermal management can be defined between 15 and 35° C., more preferably between 20 and 30° C.

US patent application publication US 2012/0141851 discloses an enclosure for an energy storage device, in particular an electrochemical cell. The housing is configured to house at least one electrochemical cell at an operating temperature greater than about 100 degrees Celsius, such as between 250 degrees Celsius and 400 degrees Celsius or between 400 degrees Celsius and 700 degrees Celsius.

In general, thermal systems for heating and/or cooling the battery modules can be divided into direct and passive systems, depending on the location and contact of the cooling system with the battery modules. The WO patent application 2012126111A1 describes an active, direct cooling system where battery modules are sandwiched with a system of battery cell coolers. A similar principle using a direct cooling system is offered by the US patent application 2013143093A1. Another kind of direct cooling system is pointed out in the WO patent application WO2016056774A1. The main disadvantage of direct cooling systems is the case of leakage during with a fluid could get into direct contact with the energized batteries with the potential danger of short circuit of the batteries and a fire case. Further, the accessibility is more challenging, e.g. during a repair case. Also after a crash or an impact case, separate compartments enable a faster replacement of single components without having a total damage of the complete system.

An example for a passive, indirect working thermal system can be given with the WO patent application WO2005080902A1 where a cover plate designed with tubes inside is cooling, but not heating, an attached member on the upper surface. Another example of a cooling plate is mentioned in the WO patent application 2016096329A1 whereby in this case the cooling plate is intended as a mounting plate. Additionally, the US patent application 2015244044A1 also describes a kind of a cooling plate, in this case named as thermal plate manifold. Complementary, the DE patent application describes 102008059947A1 a heat conduction plate connected with the single battery cells. The US patent application 2017047624A1 pointed out fluid channels inside a monolithic body, sidewalls or the said base, optionally added with cooling ribs. Also, the last mentioned patent application can be categorized under the topic of a cooling plate. Such plates have the disadvantage of be material intensive what results into a heavy weight of the whole battery system and decreasing indirectly the battery range. Further, there exists a high loss of material because the channels are manufactured out of monolithic full materials. The total volume of the later cooling channels represents scrap. A further way of manufacturing such cooling plates is to create them as a cast component with integrated channel structured. One example can be given with the DE patent application 102015217810A1.

Moreover, a battery compartment must be assembled in a way that no kind of contamination like dirt, dust or other particles but also gases and moisture are able to penetrate into the compartment and therefore to damage the battery cells creating a short circuit resulting in a fire case. The US patent application 2010136402A1 proposed a sealed battery enclosure whereby an impermeable sealing gasket is interposed between two housing members to seal the battery cells inside from the outside environment. Further, a plurality of bolts fixed the system outside from the sealing gasket. Another way is described in the WO patent application 2018029020A1 where support projections are used to solve the problem with a special view on the electromagnetic compatibility. Additionally, the WO patent application 9726782A2 mentioned a seal element with conductive properties and in coated condition. Such special elements are cost-intensive and difficult to implement into big industrial high-volume vehicles.

To protect the battery cells inside a battery compartment, also the manufacturing and assembling of such a compartment must be executed with particular focus on undesired particles inside the compartment. Thermal joining processes like welding or brazing have the disadvantage of producing welding splatters, traces of powder and dirt or for corrosion resistance undesired annealing colors. Additionally, topics like heat input, thermal stresses and thermal distortion must be considered. To connect a battery tray manufactured out of a resin with a battery cover, the US patent application 2011143179A1 describes the usage of fastening members on the flange portion.

Furthermore, as one main frame conditions, the limited package of the battery compartment must be considered, for passenger cars with an electric drive mostly arranged in the underbody area of the vehicle. State of the art, mostly aluminum extrusion or press-drawn profiles are used with their natural benefits of having complex forms. Also die-cast aluminum is used to create casted cooling channels into the structure of a battery compartment. One example for an extensive use of extruded aluminum profiles can be given with the WO patent application 2018024483A1 where such profiles as hollow-chamber elements are used as heat exchangers to create a temperature device inside a battery compartment. The device used a fluid and is divided into different tempering cells having in each case a heat exchanger surface with the different battery modules. Again, the thermal system is not separated from the battery cells consequently in a case of a leakage and the system is intensive for assembling and space.

State of the art, there are different solutions how to seal and connect the different compartment members to protect the inner battery cells with a closed housing. But a simple, cost-effective system for further functionalities, especially the thermal management, is not available. Further, a way to use flat metallic sheets with their benefit of cost-effective high-volume forming processes for an automotive mass production is not offered. Also the physical effects of thin metallic sheets are not used for a thermal system state of the art. These effects can be described with formula (1) for the thermal conduction with the law of Fourier, well known in the literature:

$$Q = \lambda \cdot A \cdot (T_1 - T_2)/t \quad (1),$$

whereby Q represents the thermal capacity [W] which is influenced for a one-dimensional case of a flat sheet by the thermal conductivity $\lambda$ [W/(m·K)] of the sheet material, the area A [mm$^2$] of the orthogonal flowed area of the sheet, the difference in temperature between the temperature of the warmer side $T_1$ [K] and the temperature of the cooler side $T_2$ [K]. AT last the thermal capacity is also influenced by the thickness of the sheet.

Therefore, the object of the present invention is to eliminate some drawbacks of the prior art and to achieve a supporting housing for a battery compartment of electric drive vehicles by using flat metallic sheets as at least two deep-drawn shells which are fitted into each other whereby at least one double-floor is created into which a passive and partly integrated thermal system for cooling and heating is integrated. As a preferred embodiment of the present invention, the deep-drawn shells are manufactured with protruding flanges. The invention also relates to the integration of further functionality-elements like sensors for status measurement are integrated into the "double-floor" and connected with the battery management system.

As one preferred embodiment of the method of the present invention, contact surfaces of one shell with the innermost shell are created by deep-drawing so that a defined positioning to one another and a defined area inside the double-flor system are given, view FIG. 2. These contact surfaces of the shells surround the floor space of the innermost shell where the battery modules are located and having a width identical with the radius of the innermost shell, preferably between 5.0 mm≤r≤9.0 mm. This space is on the one side closely enough to enable a high space efficiency with a high number of integrated battery modules. On the other side, there is with the contact surfaces a defined distance between the battery modules and the lateral walls of the innermost shell as a further crash safety (possible way of maximum intrusion) and a further cooling space by air.

At least two isolating valves working as an inlet valve and an outlet valve connected with surrounding cooling circuit elements are installed at the outer shell to enable a continuous fluid flow as a closed cooling system. A flowing fluid is used and could be water, ideally with defroster additives, a coolant or a refrigerant.

As a preferred embodiment of the present invention, the inlet valve is carried out as a long bar, which can be called here as a first bar, with inlet nozzles over the total width of the outermost shell less both radii to enable an evenly spread of the incoming fluid and to therefore reach an effective cooling performance. To further enable a high cooling efficiency, the bar must be located in height over the resistance heating element. On the opposite side of the outermost shell, the outlet valve is carried out by a discharge bar, which can be called here as a second bar, to enable the escape of the fluid. The radii of the shells, which are preferably between 5.0 mm≤r≤8.0 mm function as a safety distance between the battery modules and the shell so that in this area no active enabled flowing of the fluid is necessary. To integrate the bars into the outermost shell, openings can be cutted after deep-drawing into the shell, e.g. by laser beam cutting. After that, the bars can be plugged into the openings and, if necessary, bonded or welded with filler metal from the outer side as a lap joint.

To create a heating system, different embodiments could be integrated into the double-floor system. Technical knitwear or technical fabrics manufactured out of metal wires can be installed inside the formed/structured sheets and uses the physical operating principle of electric resistance heating. As a favorable design, the used knitwear is manufactured with a copper alloy to use with a good thermal conduction the law of Joule, view formula (2)

$$(Q=I^2*R*t) \quad (2),$$

whereby I represent the current [A], R the sum of all contact and material resistances [Ω] and t the time [s].

A typical temperature should not exceed 60° C., more preferably not 45° C. for the knitwear inside the double-floor system. One important design criterion for a good durability of the system is to separate the copper-alloyed knitwear from the stainless steel shell to avoid bimetallic corrosion. Bimetallic corrosion can be defined according to DIN EN ISO 8044 as a special form of galvanic corrosion or with a more colloquial expression as contact corrosion between two metals. Without a defined separation, the cooling fluid inside the thermal system will be functioned as a conductive liquid film, a so-called electrolyte. The more noble stainless steel shells will worked as a cathode whereby the copper-alloyed knitwear as the unnoble material functioned as an anode. In the case of the present invention the area ratio $i_{EL}$ is unfavorable and enables bimetallic corrosion. The area ration can be defined with formula (3) as:

$$i_{EL}=F_K/F_A \quad (3),$$

whereby $F_K$ is the area of the cathode and $F_A$ the area of the anode. Therefore in the method of the present invention the copper-alloyed knitwear is isolated to the stainless steel shell by an isolating material, e.g. by a plastic foil or an insulating foil of a polyamide, more preferably by Teflon coating or foil.

With a view to a good balanced system with an untroubled fluid flow for cooling efficiency on the one side, and a fast heating time of the system on the other side, a ratio of the height $r_h$ of the free flow area $r_f$ to the height of the electric resistance heating element $r_e$ can be defined with formula (4):

$$r_h=r_f/r_e \quad (4),$$

whereby the ratio should be $r_h \geq 1.0$, more preferably $1.0 \leq r_h \leq 2.0$.

In the case of an up-heating, the two isolating valves are closed to stop the fluid flow. Then the resistance heating is started and heats therefore the stagnant fluid inside the double-floor system. Such an area wide heating mechanism allows the fast and effective heating of all battery modules with short heating rates without a danger of overheating and necessary high energy input. For a later cooling, the both isolating valves are opened again and the resistance heating is stopped what enables a continuous fluid flow resulting in a cooling effect. If necessary, also a local heating can be realized with the method of the present invention by just locally applying the resistance heating elements. Further needed hardware for a complete thermal system like a pump, a pressure compensation valve, a further drain valve, connecting lines, a fluid reservoir like a tank or a cooler like a radiator, a chiller or a condenser can be applied from state-of-the-art solutions. The same proceeding can be determined for needed software like a control unit. As an electricity supply for the thermal system, the battery cells themselves are used.

An anticipatory thermal management with a predictive regulation is sought as a preferred embodiment of the present invention to enable a high efficiency ratio and a high durability of the battery cells as well as a higher range. In thic case, the control unit can be connected and linked with the navigation system to know about coming gradients, the road type (city traffic, country road or motorway) or the desired range. Further, general data like time of year, expected and actual outside temperature and locality can be consulted to determine a meaningful thermal strategy with timely cooling or heating. But also during stationary situations like charging of the batteries, the thermal system must be active so that the loading efficiency ensured. This is particularly necessary during rapid charging where more heat is generated. With the method of the present invention, such possibilities are from a hardware side without constraints feasible and to favor.

It is state-of-the-art for battery electric vehicles to connect the cooling circuit of the batteries with the the air-conditioning system by interconnecting with the refrigeration circuit. With the method of the present invention, it would be also possible to realize such an interconnecting, but is not focused.

To realize a temperature balance to the desired temperature range between 15° and 35° C. with the above described method, the mechanism of thermal convection between the flowing fluid and the inner shell directed to the battery modules is used. Inside the sheet material, thermal conduction takes place before the thermal transfer between the inner shell and the battery modules, optionally with a heat transfer compound like a heat-conducting paste in between proceeds.

As a preferably material selection, stainless steels are used to fulfil the method of the present invention because of their corrosion, heat and acid resistance, in general high formability, their high recyclability and their worldwide availability as flat sheets combined with high experience as deep-drawing materials over decades, e.g. as kitchen sinks. Thereby the thickness of the flat metallic sheets are $t \leq 3.0$ mm, more preferably $t \leq 1.0$ mm to realize a tight but lightweight and cost-efficient shell construction. For the case of the present invention, it is preferably to use a higher corrosion resistant austenitic stainless steel alloyed with chromium and nickel, optionally with molybdenum for the outermost shell in a thicker condition than the innermost shell. Because of the microstructure-depending significant lower thermal conductivity in relation to a ferritic microstructure, plus the circumstance of a thicker sheet, the austenitic outermost shell works like an isolator to the external environment. That makes the system more efficient and independent from outside temperatures. At the same time, the innermost shell should be performed with a ferritic stainless steel, thinner than the austenitic outermost shell and because of the significant higher thermal conductivity with the function of a good thermal conductor. As a result, the at least two shells are different in their microstructure and work therefore like a thermal conductor to the battery modules and like an isolator to the surrounding area at the same time. An ideal material set-up can be created by having a ratio in thermal conductivity of $r_\lambda \leq 0.6$. Further, the effect can be supported by a thickness difference of the different shells. The difference can be defined as a thickness ration $r_t$ by formula (5):

$$r_t=r_O/r_i \quad (5),$$

whereby $r_O$ is the thickness of the outermost shell having contact with the surrounding area and $r_i$ is the thickness of the innermost shell having contact with the battery modules. As an ideal embodiment the ration is $r_t \geq 2.0$, more preferably $2.5 \leq r_t \leq 3.5$.

For the outermost shell, a further ideal embodiment of the present invention is to use strain-hardened austenitic stainless steels characterized by yield strength $R_{P0.2} \geq 400$ MPa, more preferably $R_{P0.2} \geq 800$ MPa to work like a resistor against impact. Furthermore, a constant microstructure even after forming or welding is sufficient to offer non-magnetic properties even in component status for a better electromagnetic shielding. Such grades can be characterized by a TWIP-hardening effect (Twinning Induced Plasticity) and a stacking fault energy between 20-30 mJ/m$^2$.

For the inner shell, ferritic stainless steels, particularly with titanium and/or niobium stabilized grades, could reach the necessary deep-drawability in combination with a sufficient corrosion resistance.

To protect the system against an escape of the thermal fluid, the double-floor system must be sealed. As a preferred embodiment of the present invention, the shells are deep-drawn with indentations on the protruding flanges. During deep-drawing, just a stamping into stamping direction is possible, not into the opposite direction. Therefore, the kind of indentations must be worked out differently for the different shells. For the outer-side shell, just one indentation is required. But to create a defined counterpart on the flange of the shell which is fitted into another shell, another form and number of indentations is necessary to create at the end a defined sealing area. FIG. 6 points out one possible combination of indentations to create a sealing area. The sealing itself could be performed with well-known sealing compounds like a gap filler, an adhesive, especially a windscreen adhesive, a solid gasket, viscoplastic silicone, a hot butyl, a gluing, PVC seam sealing or body-cavity sealing. These sealing compounds are used as state of the art in different automotive components today and can be adapted for the present supporting housing. In general, cost-effective systems with a fast curing process and without the necessity of further heat-input, for example needed for single-component hot-curing adhesives, should be preferred.

The deep-drawing could be performed by different drawing steps, but to have a cost-efficient manufacturing process as minimal as possible. Optionally, a trimming of the deep-drawn components is able to integrate.

One big benefit of a deep-drawn shell-construction for a thermal system and battery housing in relation to a profile or bended intensive design is that thermal joining processes like welding or brazing could be avoided and therefore risks because of thermal distortion or contamination with welding splatters or traces of powder. Furthermore, internal thermal stresses can be also avoided as well as leakage problems because of welding cracks or incomplete fusion. The joining method preferred for the method of the present invention is as a consequence a mechanical joining process like riveting or screwing located to the protruding flanges of the shells. This results into a high accessibility, a simple repair concept and reclosing. To follow the way of a fast and low-step way of battery housing manufacturing, the joining method of flow drilling is preferably used. In this case the thread is directly performed by the flow drill screw. Further, the protruding flanges of the shells could be used for a connection with the underbody or with spacer elements of the underbody, also with mechanical joining elements. With the present invention, it is also possible to carry out the battery compartment as an interchangeable system, a so-called exchangeable battery.

It is also possible to combine various shells which are fitted into each other. This will be of interest in a case where also the Battery management system (BMS) with its electrical components is needed to integrate into a closed, sealed area of the battery housing. By fitting more than two shells into each other, further protected double-floor systems are created for other functionalities of a battery electric vehicle.

Following the method of applying thin flat steel sheets instead of extruded profiles, additive manufacturing or heavy plates as a bended structure, thin austenitic stainless steels could be also used under the outermost shell as an underbody impact protection in a profiled and stacked design. A hollow structured area is the consequence, be able to work like an energy absorbing element and to protect therefore the shells. Austenitic strain-hardening grades have the possibility to cold-harden during deformation like an impact and therefore to work in a stacked design as a compression spring with a progressive characteristic line. At the same time the high ductility enables a high energy absorption potential. Some examples of profiled sheets can be corrugated sheets, honeycomb structures, flexible rolled sheets, perforated sheets, nubs and knobs sheets, trapezoidal sheets, hunched sheets, projected sheets, edge sheets or pyramid structured sheets. As a further embodiment of the present invention, transverse beams can be applied from the outer side of the outermost shell to stiffen the construction in the area of the shell floor and to further work like load paths.

Further the support housing ensures the physical protection according the UN R94 and R95 standards to protect against persons touching of the high-voltage components (IPXXB protection) which are completely covered. Further no high-voltage components are able to detach from the electric vehicle.

The functionality of the battery compartment of the present invention is independent from the mounting position within the electric vehicle. Preferably the battery compartment is located over the whole underbody to ensure a maximum battery range, a low centre of gravity and balanced driving dynamics. But also localized constructions like one-side compartments, front or rear-positioning will work. In these cases, the deep-drawn shell-construction enables an adjustment for different forms or required package solutions.

The invention works independent from the type of the used accumulator inside like nickel-cadmium, nickel-metal hybrid, lithium ion or lithium air batteries. The battery management systems (BMS) for charge and discharge control (load management), temperature monitoring, distance assessment and diagnostic devices can be integrated into the battery compartment or not for the present invention. The same works for the temperature management system with its cooling fluid and cooling channels. High-voltage cables can be integrated within the inner side of the inner bottom to protect the occupants or other persons against short circuits or electrification of the vehicle or its components.

Moreover, it is possible to integrate sensors for vibration, stress, position or movement measurement inside the double-floor-system as condition monitoring and collect data about the working behavior of the spring system inside.

In general, the method of the present invention works for all moved systems or transportation systems using battery modules. With adjustment and scaling the present invention also works for other types of electric passenger or goods transport systems like electric busses, electric commercial vehicles, electric taxis or vehicles for parcel delivery. It is appropriate to use one battery compartment with the supporting housing of the present for one vehicle. But especially for long-way transportation like goods transport with trucks as one example, various battery compartments can be integrated into the vehicle to increase the range. In this case, a supporting housing for every compartment with the complete surrounding hardware and executed in each case as a self-contained system with its own fluid circuit should be taken to realize a sufficient thermal system. The software as well as the control unit can be used to steer all compartments and thermal systems. Another reason to create different compartments with different supporting housings could be the limitation of the available coil and plate width or the maximum dimension of the tooling for the shell.

Further embodiments of the invention are described in the following. In one embodiment is provided a thermal management supporting housing for a battery compartment of electric drive vehicles. In such an embodiment at least two deep-drawn shells 1, 2 are fitted into each other whereby at least one double-floor 3 is created into which a passive and partly integrated thermal management system 4 for cooling and heating is integrated to indirectly enable a constant temperature range between 15° C. and 35° C. for battery modules 5 which are separated from the thermal management system 4 by the double-floor design. Maintaining a constant temperature range between 15° C. and 35° C. is important for optimal functioning of a battery module 5.

In one embodiment, at least two different flat metallic sheets are used for the different shells 1, 2, different in their microstructure, to work like a thermal conductor to the battery modules 5 and at the same time like an isolator to an area surrounding the thermal management support housing by having a ratio in thermal conductivity of $r_\lambda \leq 0.6$.

In an embodiment there is a thickness ratio defining a ratio of thicknesses of an outer shell 1 and an inner shell 2. The thickness ratio of an outer shell 1 thickness having contact with the surrounding area and an innermost shell 2 thickness having contact with the battery modules 5 is $r_t \geq 2.0$, more preferably $2.5 \leq r_t \leq 3.5$.

In a further embodiment ferritic stainless steels are used for the innermost shell 2 having contact with the battery modules 5 and austenitic stainless steels which are used for an outer shell 1.

In a particular embodiment the outer shell 1 is manufactured by a non-magnetic material having a yield strength $R_{P0.2} \geq 400$ MPa, more preferably $R_{P0.2} \geq 800$ MPa as a resistor against impact.

In one embodiment the heating inside the innermost double-floor is realized by closing two isolating valves 13, 14, 19, 20 to stop fluid flow and by electric resistance heating 4 having a physical effect, using technical knitwear manufactured out of copper alloy wires which are isolated to the stainless steel shells by an isolating foil manufactured out of polyamide or plastic, more preferably Teflon.

In an embodiment the cooling inside the innermost double-floor is realized by opened isolating valves 13, 14, 19, 20 and a flowing liquid like water, a coolant or a refrigerant, more preferably a liquid added with frost protection.

In a further embodiment the supporting housing has a ratio of height ($R_h$) of free flow area to height of electric resistance heating element. Preferably, the ratio is $r_h \geq 1.0$, more preferably $1.0 \leq r_h \leq 2.0$.

In a preferred embodiment the contact surfaces 8 of one shell with the innermost shell 2 are surrounding the floor space where the battery modules 5 are located and having a width identical with the radius of the innermost shell, preferably between 5.0 mm $\leq r \leq 9.0$ mm.

In a suitable embodiment indentations are deep-drawn into a flange of at least one shell to create a defined position for a sealing layer.

In a particular embodiment further functionalities are integrated into the battery housing by implementing measuring elements into double-floor like sensors for measuring surround conditions like temperature, deformation or system status.

In an embodiment further profiled sheets which are hollow structured are connected with the outer shell as further resistors against underbody impact.

In one embodiment mechanical joining processes like screwing or a combination of mechanical joining with thermal energy like flow-drilling is used to join the different shells 1, 2 with each other and a locking plate 6 with mechanical joining elements 7.

In a further embodiment a two-half-shell-system as a battery compartment for the battery modules 5 is used whereby at least one half-shell-side is fitted into another deep-drawn shell to create at least one thermal system area inside a double-floor system 3 surrounding the battery compartment.

In one embodiment a first bar with inlet nozzles 13, 14, 19, 20 and a second bar as a discharge bar are integrated into the outermost shell 1, preferably over the total width of the shell less both radii, to realize an effective cooling concept with a flowing fluid.

The present invention is illustrated in more details referring to the following drawings where FIG. 1 shows one preferred embodiment of the invention schematically seen from the side view.

Figure 1:
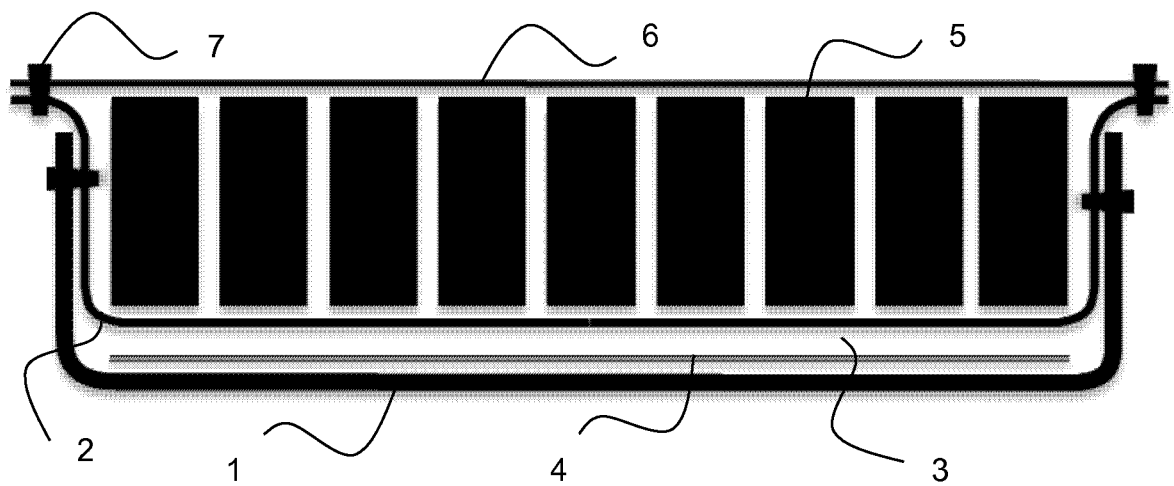

FIG. 1 illustrates a first deep-drawn shell (1) into which a second deep-drawn shell (2) is fitted to create an area inside a double-floor system (3) in which a resistance heating element (4) is putted before closing. The battery modules (5) are separated from the thermal management system by their location outside the double-floor system in the innermost shell, here (2). A locking plate (6) closed the shell (2) with the battery modules (5) inside. The connection between the shells (1) and (2) and between the innermost shell (2) with the locking plate (6) is realized with mechanical joining elements (7).

Figure 2:
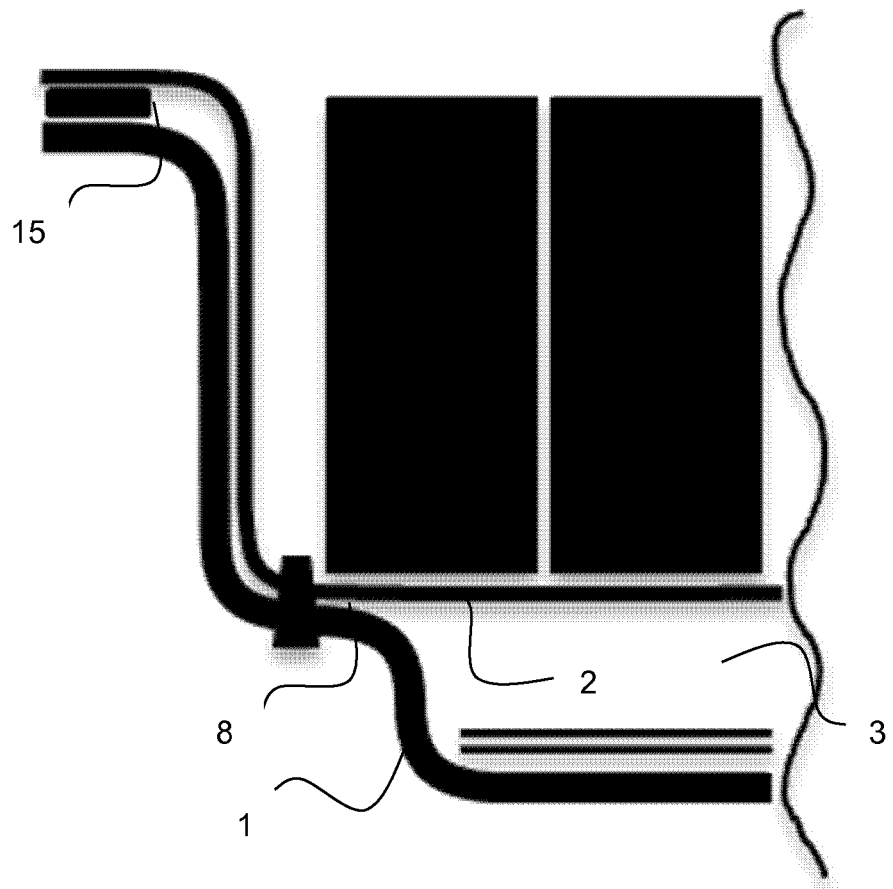
FIG. 2 shows another preferred embodiment of the invention schematically seen from the side view as a sectional view of the double-floor.

FIG. 2 illustrates one preferred embodiment of the shell arrangement whereby a first shell (1), into which an inner shell (2) is fitted, is designed by having supporting contact surfaces (8) so that a defined positioning to one another and a defined area inside the double-flor system are given.

Figure 3:
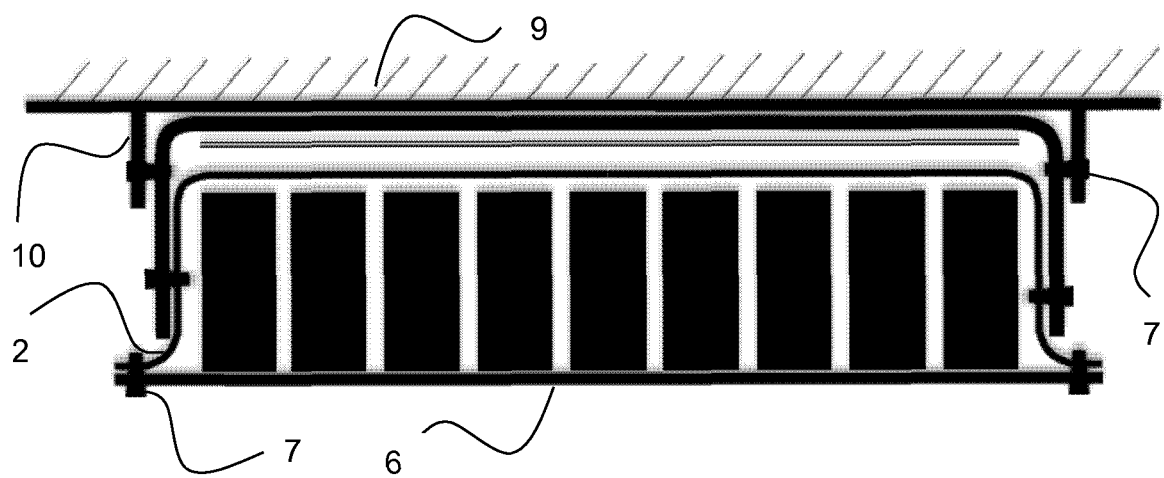
FIG. 3 shows another preferred embodiment of the invention schematically seen from the side view.

FIG. 3 illustrates the connection of the battery housing with the underbody (9) by using spacer elements (10) connected with the battery housing by mechanical joining elements (7). In this figure, the arrangement is changed creating another preferred embodiment of the invention so that double-floor system (3) with the resistance heating element (4) is connected in a first step with the underbody. During a second assembling step, the locking plate (6) with applied battery modules (5) is connected from below with the innermost shell (2) with mechanical joining elements (7).

Figure 4:
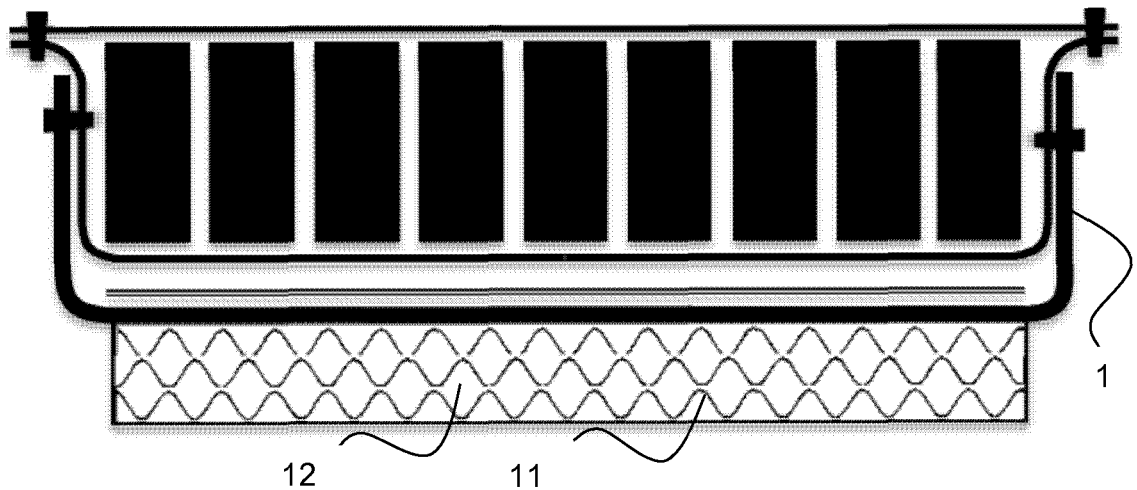
FIG. 4 shows another preferred embodiment of the invention schematically seen from the side view.

FIG. 4 illustrates further sheets in profiled form (11) which create a hollow structured area (12) and are connected with the outermost shell (1) as further resistors against underbody impact.

Figure 5:
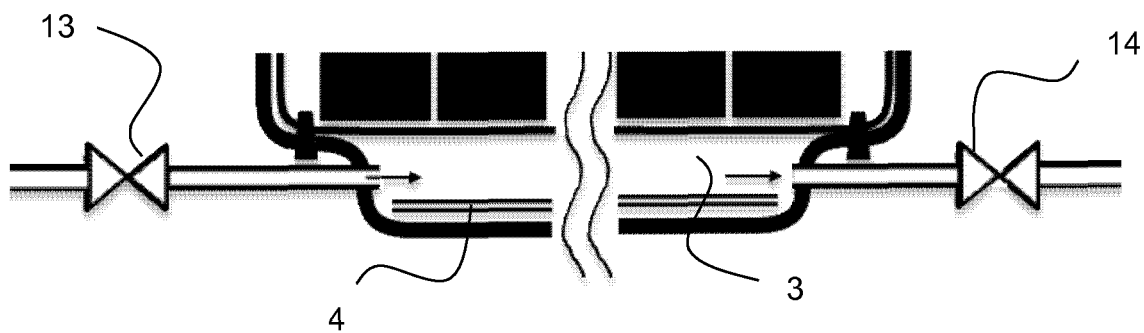
FIG. 5 shows another preferred embodiment of the invention schematically seen from the side view as a sectional view of the fluid flow.

FIG. 5 illustrates in a sectional view the thermal management system. During cooling, the both isolating valves called inlet valve (13) and outlet valve (14) are opened and enable a cooling with a continuous fluid flow. If heating is necessary, the both isolating valves are closed and the resistance heating element (4) is started and heats therefore the stagnant fluid inside the double-floor system (3).

Figure 6:
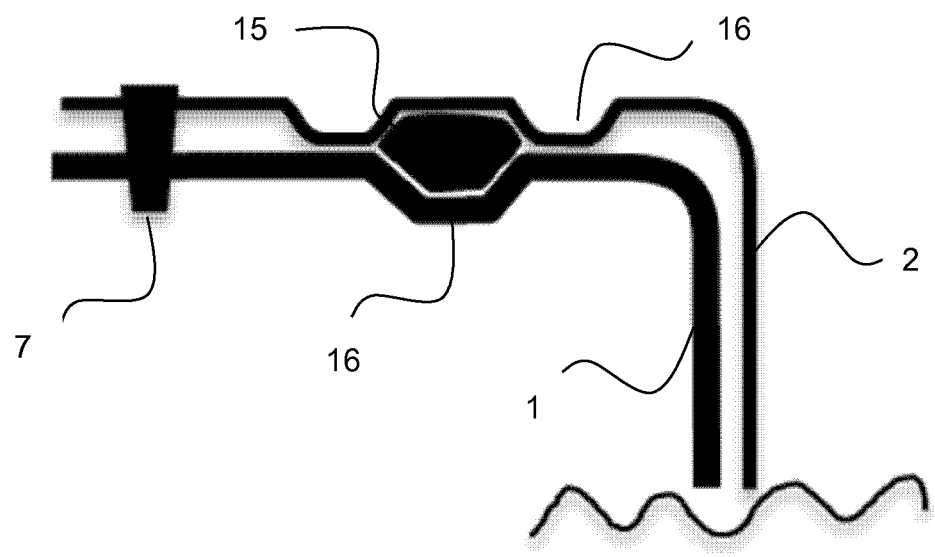
FIG. 6 shows another preferred embodiment of the invention schematically seen from the side view as a sectional view of the sealing layer.

FIG. 6 illustrates in a sectional view the sealing layer (15) of a first deep-drawn shell (1) with a second deep-drawn shell (2) which is fitted into (1). To seal the inner double-floor system (3) from the outdoor environment and to avoid any kind of contamination like dirt, dust, other particles or moisture from outside, but also to avoid a discharge of liquid from the double-floor system, the sealing layer is covered into deep-drawn indentations (16) located at the flange of the shells. The mechanical joining elements (7) must be arrangement outside the indentations (16) and sealing layer (15).

Figure 7:
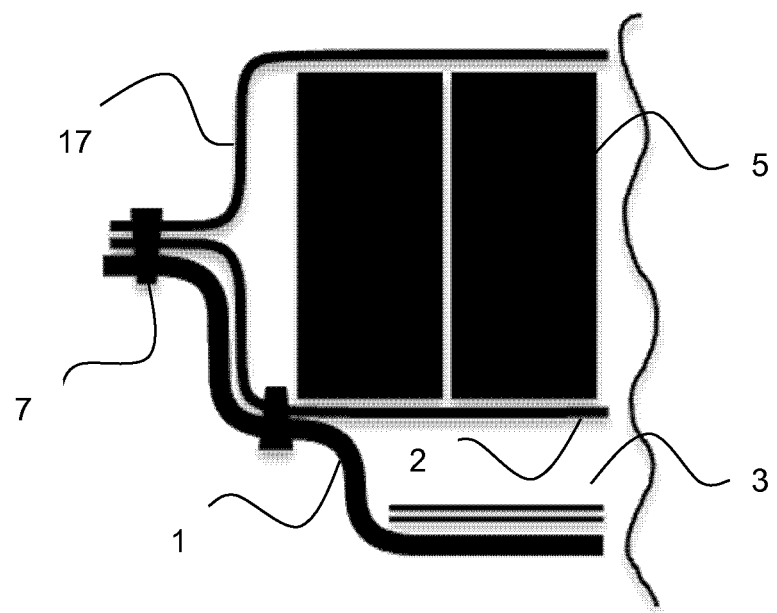
FIG. 7 shows another preferred embodiment of the invention schematically seen from the side view.

FIG. 7 illustrates another preferred embodiment of present invention to use instead of a locking plate (6) another deep-drawn shell (17) to create a two-half-shell-system for the battery modules. In a favorable way, the additional deep-drawn shell (17) is identically with the innermost shell (2) to need just one deep-drawing tool for booth shells. At least one half-shell-side is fitted into a first deep-drawn shell (1) to create a thermal system area inside a double-floor system (3). Also here, mechanical joining elements (7) could be used to connect the shells.

Figure 8:
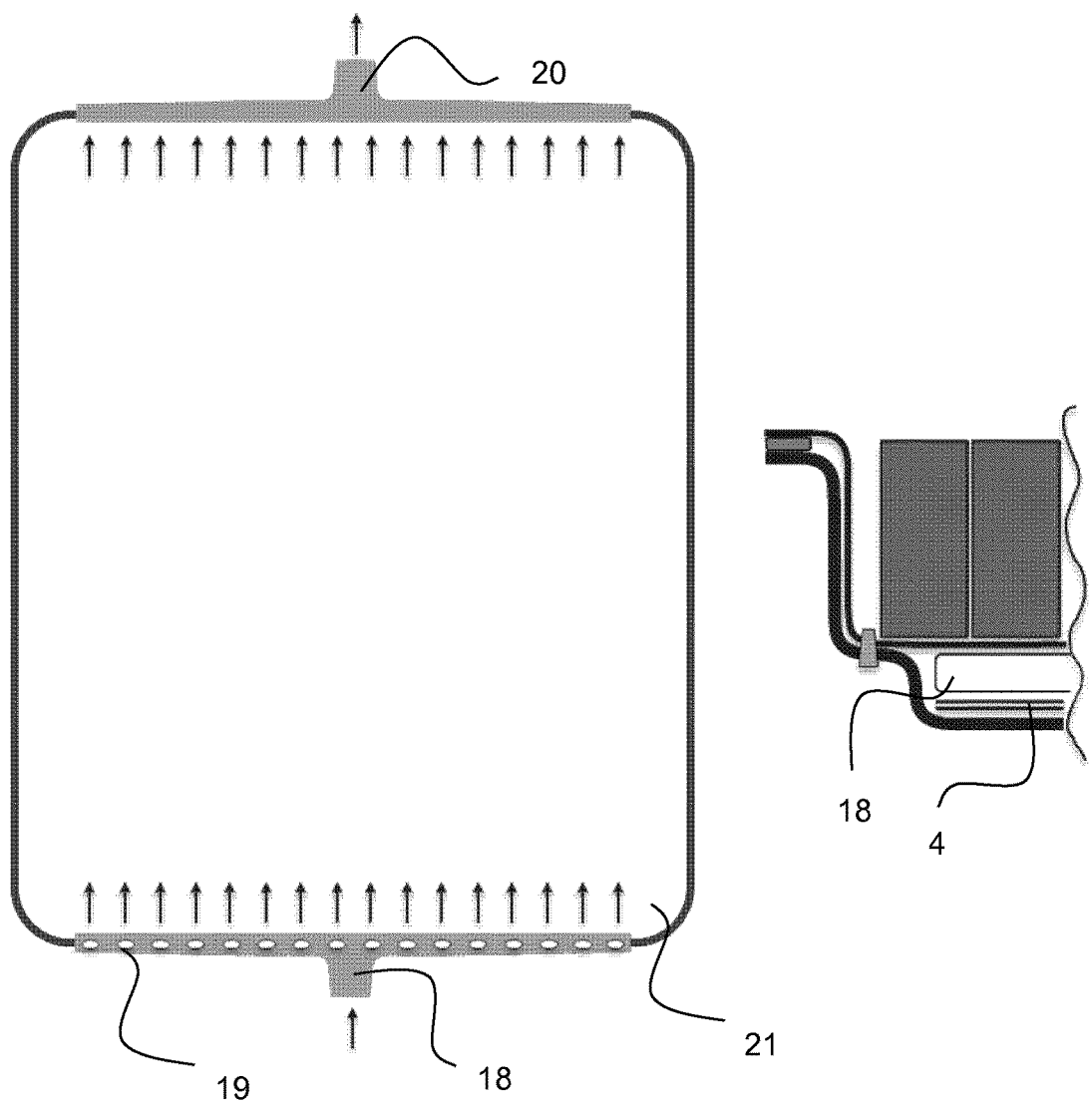
FIG. 8 shows a preferred embodiment of a valve system schematically seen from the top view (left) and a sectional side view (right).

FIG. 8 illustrates a preferred embodiment of a valve system whereby a bar (18) with inlet nozzles (19) is integrated as an inlet valve (13 from FIG. 4) to enable an entering of the fluid. On the opposite side of the outermost shell, a second bar (20) as an outlet valve (14 from FIG. 4) is integrated as a discharge element of the fluid. As a preferred embodiment of the fluid flow, both bars are located over the total width of the shell less both radii (21). Thereby, as visible from the sectional side view on the right side of FIG. 8, the bars are located in height over the resistance heating element (4).

Figure 9:
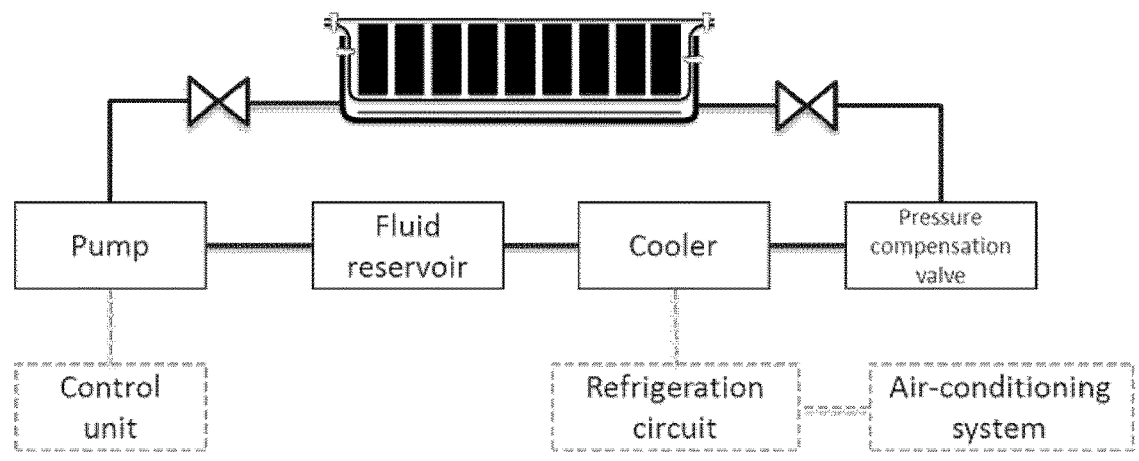
FIG. 9 shows one typical circuit as a schematically circuit diagram.

FIG. 9 illustrates one typical circuit as a schematically circuit diagram with the different components and possible interconnections. The order and the usage of single components can vary.

The invention claimed is:

1. Thermal management supporting housing for a battery compartment of electric drive vehicles wherein at least two deep-drawn shells (1, 2) are fitted into each other whereby at least one double-floor (3) comprised of an inner shell (2) and an outer shell (1) is created into which a thermal management system (4) is integrated, said thermal management system (4) being positioned between an outer floor of the inner shell (2) and an inner floor of the outer shell (1), battery modules (5) positioned inside the inner shell (2), said battery modules (5) separated from the thermal management system (4) positioned between the outer floor of the inner shell (2) and the inner floor of the outer shell (1) of the at least one double-floor (3), wherein the thermal management system (4) is configured for cooling and heating and to indirectly maintain the battery modules (5) at a temperature in a range between 15° C. and 35° C.

2. Thermal management supporting housing for a battery compartment according to the claim 1, wherein at least two different flat metallic sheets having different thermal conductivities are used for the different shells (1, 2), different in their microstructure, to work like a thermal conductor to the battery modules (5) and at the same time like an isolator to an area surrounding the thermal management support housing by having a ratio in thermal conductivity of $r_\lambda \leq 0.6$.

3. The supporting housing according to the claim 1, characterized in that a thickness ratio of an outer shell (1) thickness having contact with the surrounding area and an innermost shell (2) thickness having contact with the battery modules (5) is $r_t > 2.0$, more preferably $2.5 \leq r_t \leq 3.5$.

4. The supporting housing according to claim 1, wherein ferritic stainless steels are used for the innermost shell (2) having contact with the battery modules (5) and austenitic stainless steels are used for an outer shell (1).

5. The supporting housing according to claim 1, wherein the outer shell (1) is manufactured by a non-magnetic material having a yield strength $R_{P0.2} \geq 400$ MPa, more preferably $R_{P0.2} \geq 800$ MPa as a resistor against impact.

6. The supporting housing according to claim 1, wherein the heating inside the innermost double-floor is realized by closing two isolating valves (13, 14, 19, 20) to stop fluid flow and by electric resistance heating (4) having a physical effect, using technical knitwear manufactured out of copper alloy wires which are isolated to the stainless steel shells by an isolating foil manufactured out of polyamide or plastic, more preferably Teflon.

7. The supporting housing according to the claim 1, wherein the cooling inside the inner shell (2) of the double-floor (3) is realized by opened isolating valves (13, 14, 19, 20) and a flowing liquid like water, a coolant or a refrigerant, more preferably a liquid added with frost protection.

8. The supporting housing according to the claim 1, having a ratio of height ($R_h$) of free flow area to height of electric resistance heating element wherein the ratio is $r_h \geq 1.0$, more preferably $1.0 \leq r_h \leq 2.0$.

9. The supporting housing according to the claim 1, wherein contact surfaces (8) of one shell with the innermost shell (2) are surrounding the floor space where the battery modules (5) are located and having a width identical with the radius of the innermost shell, preferably between 5.0 mm ≤ r ≤ 9.0 mm.

10. The supporting housing according to the claim 1, wherein indentations are deep-drawn into a flange of at least one shell to create a defined position for a sealing layer.

11. The supporting housing according to the claim 1, wherein further functionalities are integrated into the battery housing by implementing measuring elements into double-floor like sensors for measuring surround conditions like temperature, deformation or system status.

12. The supporting housing according to the claim 1, wherein further profiled sheets which are hollow structured are connected with the outer shell as further resistors against underbody impact.

13. The supporting housing according to the claim 1, wherein mechanical joining processes like screwing or a combination of mechanical joining with thermal energy like flow-drilling is used to join the different shells (1, 2) with each other and a locking plate (6) with mechanical joining elements (7).

14. The supporting housing according to claim 1, wherein a two-half-shell-system as a battery compartment for the battery modules (5) is used whereby at least one half-shell-side is fitted into another deep-drawn shell to create at least one thermal system area inside a double-floor system (3) surrounding the battery compartment.

15. The supporting housing according to the claim 1, wherein a first bar with inlet nozzles (13, 14, 19, 20) and a second bar as a discharge bar are integrated into the outermost shell (1), preferably over the total width of the shell less both radii, to realize an effective cooling concept with a flowing fluid.

\* \* \* \* \*